US008229474B2

(12) United States Patent
Gao et al.

(10) Patent No.: US 8,229,474 B2
(45) Date of Patent: Jul. 24, 2012

(54) METHOD AND SYSTEM FOR TERMINAL ACCESS

(75) Inventors: Quanzhong Gao, Shenzhen (CN); Mingxia Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 636 days.

(21) Appl. No.: 12/276,741

(22) Filed: Nov. 24, 2008

(65) Prior Publication Data

US 2009/0093262 A1 Apr. 9, 2009

Related U.S. Application Data

(63) Continuation of application No. PCT/CN2007/001680, filed on May 24, 2007.

(30) Foreign Application Priority Data

May 24, 2006 (CN) .......................... 2006 1 0078414

(51) Int. Cl.
*H04W 68/00* (2009.01)
*H04B 7/00* (2006.01)
(52) U.S. Cl. ...................................... 455/458; 455/515
(58) Field of Classification Search .................. 455/458, 455/515
See application file for complete search history.

(56) References Cited

U.S. PATENT DOCUMENTS

| 4,494,228 | A | 1/1985 | Gutleber |  |
|---|---|---|---|---|
| 6,665,283 | B2* | 12/2003 | Harris et al. | 370/333 |
| 7,848,305 | B2* | 12/2010 | Joshi et al. | 370/345 |

| 2005/0157692 | A1 | 7/2005 | Gerakoulis |
|---|---|---|---|
| 2005/0220057 | A1 | 10/2005 | Monsen |
| 2006/0040702 | A1 | 2/2006 | Willenegger et al. |

FOREIGN PATENT DOCUMENTS

| CN | 1533203 A | 9/2004 |
|---|---|---|
| CN | 1553715 A | 12/2004 |
| EP | 1746795 A2 | 1/2007 |
| WO | 2005/008937 A2 | 1/2005 |

(Continued)

OTHER PUBLICATIONS

International Search Report for International Application No. PCT/CN2007/001680, dated Aug. 30, 2007, and English translation thereof.

(Continued)

*Primary Examiner* — Lester Kincaid
*Assistant Examiner* — Joel Ajayi
(74) *Attorney, Agent, or Firm* — Harness, Dickey & Pierce, P.L.C.

(57) ABSTRACT

A system and method for terminal access includes transmitting a paging message from a network to a terminal; determining, by the terminal, orthogonal code information which differs from the one being used for current system access according to a predetermined rule; acquiring by the terminal a corresponding orthogonal code according to the orthogonal code information and modulating an access probe according to the orthogonal code; and transmitting the access probe by the terminal to the network and performing network access. In the various embodiments, the terminal responding to the paging selects a unique access orthogonal code according to the method and system. According to various embodiments, conflicts are minimized as a result of using the same orthogonal code between the terminals responding to the paging and between the terminal responding to the paging and the terminal originating the call. Accordingly, latency in the response to paging may be reduced.

18 Claims, 4 Drawing Sheets

FOREIGN PATENT DOCUMENTS

WO  2006/099577 A1  9/2006

OTHER PUBLICATIONS

IEEE 802.20 Working Group on Mobile Broadband Wireless Access. QFDD and QTDD: Proposed Draft Air Interface Specification. Oct. 28, 2005.

First Chinese Office Action regarding Application No. 200610078414.1, mailed Apr. 25, 2008. Partial translation provided by Huawei Technologies Co., Ltd.

Second Chinese Office Action regarding Application No. 200610078414.1, mailed Oct. 10, 2008. Translation provided by Huawei Technologies Co., Ltd.

* cited by examiner

| Field | Length (bits) |
|---|---|
| IsSecure | 1 |
| NumATIRecords | 5 |
| NumATIRecords number of the following 2 fields | |
| ATIRecord | 2 or 34 |
| OpenConnectionRequired | 1 |
| Reserved | 0-7 |

Fig. 3

| Field | Length (bits) |
|---|---|
| MessageID | 8 |
| UATI | 128 |

METHOD AND SYSTEM FOR TERMINAL ACCESS

CROSS-REFERENCE TO RELATED APPLICATIONS

This application is a continuation of International Application No. PCT/CN2007/001680, filed May 24, 2007. This application claims the benefit and priority of Chinese Application No. 200610078414.1, filed May 24, 2006. The entire disclosures of each of the above applications are incorporated herein by reference.

FIELD

The present disclosure relates to communication field, and more specifically to method and system for terminal access.

BACKGROUND

This section provides background information related to the present disclosure and is not necessarily prior art.

In wireless communication, the upward access channel is the common shared channel and each terminal device may initiate an access procedure on the channel of its will. Therefore, if two or more terminals transmit access information concurrently, signals at the air interface may be mixed up. This will cause the receiver incapable of demodulating the signals from each transmitter, which is referred to as random access collision.

The method for random access is a procedure where access is initiated in the form of access probes. To reduce collision, orthogonal codes may be used to modulate the contents of the access probes. Different terminals may use different orthogonal codes to perform modulation for random access. In this way, the random access messages can be correctly received by the receiver even if the access probes are transmitted concurrently. However, in the scenario where different terminals simultaneously use the same orthogonal code to perform modulation, interference with one another may occur and the receiver may not be able to extract the useful information. Accordingly, in order to improve the performance of random access, it is necessary that the terminals avoid selecting the same orthogonal code at the same time of transmission.

In wireless communication, the reasons that the random access initiated by the terminal can be represented by different values. There are two primary types: paging response and initial call originated by the terminal. Paging refers to that a remote terminal calls a terminal in the wireless communication system. The terminal in the wireless communication system is known as a called party. Since the link from the remote side to the network has already been setup, the requirement for access latency is more demanding than that of the terminals, in the same condition, which originate the call. According to the different reasons for which the terminal initiates the random access, the conflicts as a result of utilizing the same orthogonal code by different terminals may be categorized into the conflicts between terminals which respond to the paging, the conflicts between the terminals which respond to the paging and the terminals which originate the call, and the conflicts between terminals which originate the call.

There are various ways to generate an orthogonal code, such as Walsh sequence, Golay sequence, etc. Walsh code is a code sequence consisting of 0, 1 or 1, −1 with its code length of 2n. Once the dimension of the Walsh code is determined, each combination of the Walsh codes can be determined. For instance, Walsh code of 1024 dimensions has 1024 different types of code sequences. Each sequence is 1024 bits in length, which may be referred to as 1024 code sequences. Every two code sequences are orthogonal to each other.

The random access with respect to the existing IEEE 802.20 protocol utilizes Walsh code with 1024 dimensions to modulate the contents of the access probes. Index number for 1024 code sequences is numbered as 0-1023, wherein index numbers 0-17 are reserved for the activation group for the purpose of handoff, power control and time correction. Index numbers 18-1023 (1006 in total) are reserved for the access terminal (AT) for transmitting access probes. The access terminal shall select a Walsh code using a uniform probability distribution over the 1006 index numbers no matter the access reason is to response a paging or to originate a call.

Figure 1:
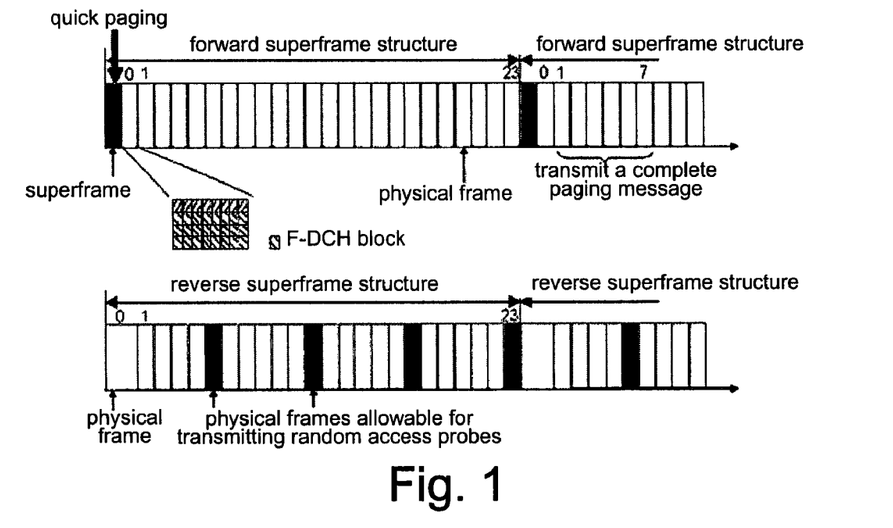
FIG. 1 is a prior art structure of a superframe according to IEEE 802.20 protocol.
Figure 2:
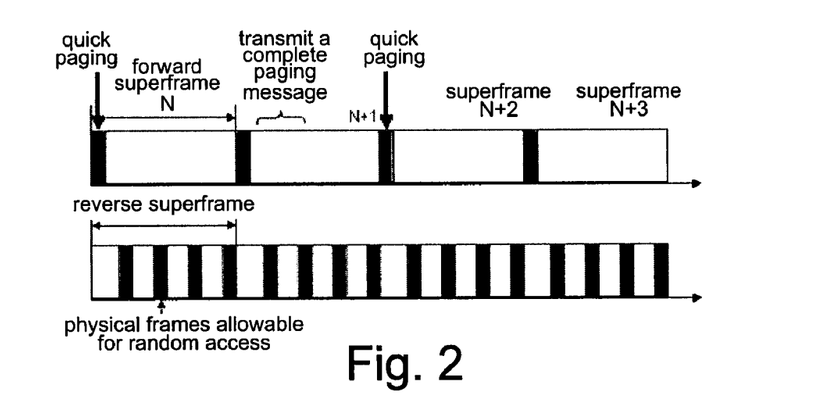
FIG. 2 is a prior art diagram of a quick paging message and a complete paging message according to IEEE 802.20 protocol.

Paging is implemented using the downlink physical channel which is made up of several superframes. Each superframe includes a preamble at the beginning of the superframe and 24 physical frames, as illustrated in FIG. 1 and FIG. 2. FIG. 1 is the structure of a superframe specified by the existing IEEE 802.20 protocol. FIG. 2 is a schematic diagram of paging transmission and random access. It can be seen from the figures that every two superframes may transmit a quick paging block in the preamble of the first superframe. In the case where there is only one paging message, the quick paging block may include the entire content of the paging message, which may also be referred to as one step paging. In the case where the paging block includes 2 to 8 paging messages (8 paging messages at most), a complete paging message will be transmitted in the forward dedicated channel F-DCH on the frames which have physical frame numbers 1-7 of the superframe after the superframe where the quick paging block was sent. Such case may be referred to as a two-step paging. On the uplink physical channel, every superframe has 4 physical frames, with equal length, allowed to transmit random access probes, as illustrated in FIG. 1.

Figure 3:
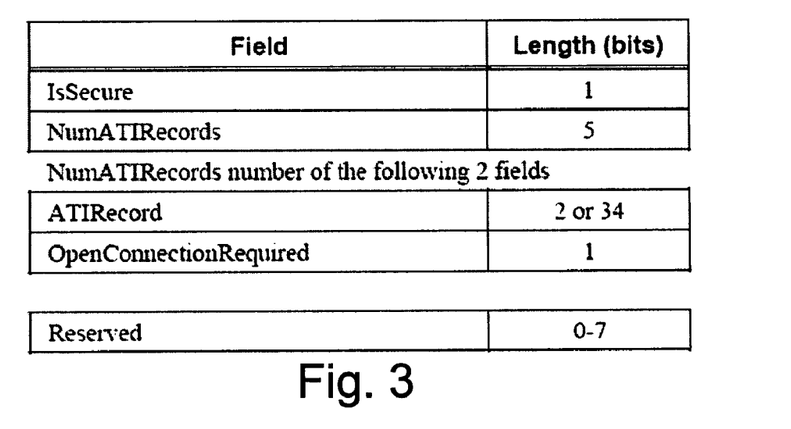
FIG. 3 is a prior art diagram of each field constituting the paging massage in the F-DCH.

The content of the paging massage in the F-DCH is illustrated in FIG. 3. The field of the number of terminal ID, NumATIRecords, is 5 bits in length, indicating the number of paging messages of the terminals in the message. The times of the occurrences of two fields appeared later on, i.e., the terminal identifiers ATIRecords and the OpenConnectionRequired indicating whether a connection needs to be setup, is the value of parameters NumATIRecords. That is, the number of paging messages of the terminals refers to how many times these two fields have appeared. The number is ordered in sequence.

Figure 4:
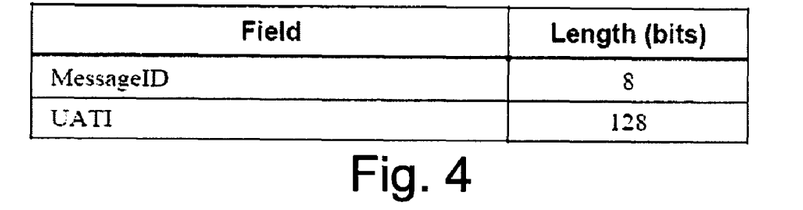
FIG. 4 is a prior art format of a PageUATI message.

The paging message may also be transmitted to the terminal via paging message PageUATI in the F-DCH, as shown in FIG. 4. Paging to a terminal can be completed in this message. Such paging message may be a broadcasting message which can be received by all the terminals and the UATI field, and terminal unicast identifier in the message will be matched with the UATI preserved in the terminal.

Figure 5:
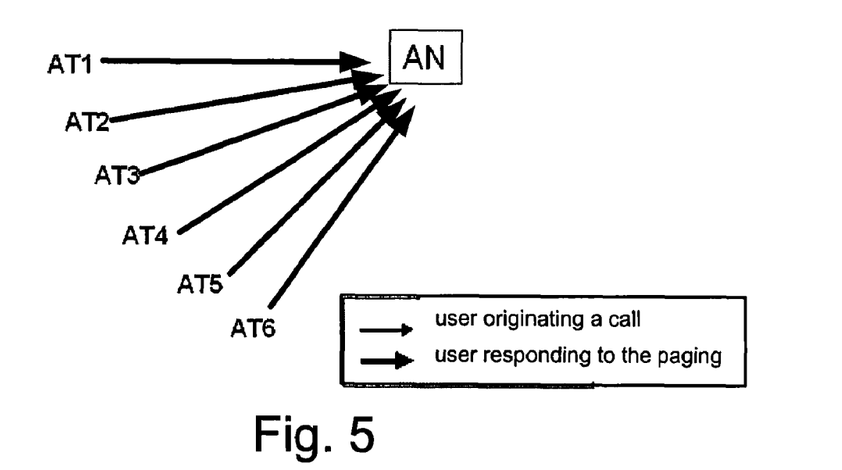
FIG. 5 is a prior art diagram illustrating collision between different terminals which respond to the paging at the same time and between the terminal which responds to the paging and the terminal which originates the call at the same time.

According to the prior art, orthogonal codes are selected based on algorithms by all the terminals which intend to initiate random accesses. Therefore, it can hardly be prevented that the terminals, when responding to the paging, may select the same orthogonal code that the other terminals may select during an initiation for the call may. Moreover, it can hardly be prevented that the terminal, when responding to the paging, may select the same orthogonal code that the other terminals may select when responding to the paging. FIG. 5 is a schematic diagram illustrating the collision between different terminals which respond to the paging at the same time and the collision between the terminal which responds to the paging and the terminal which originates the call at the same time. As such, the terminal which responds to the paging may need several times of transmission of the probe until accessing into a system, which thereby extends the latency in the response to the paging and impacts the paging performance.

SUMMARY

This section provides a general summary of the disclosure, and is not a comprehensive disclosure of its full scope or all of its features.

Various embodiments provide methods and systems for a terminal which responses to paging to access network. According to the embodiments, the present disclosure is aimed to resolve the issues of potential collision that the terminal responding to the paging may incur during terminal access procedure and thus the increase of latency in the response to the paging and the impact on the paging performance.

There is provided a method for terminal access. The method includes transmitting a paging message from a network to a terminal; determining by the terminal orthogonal code information which differs from the one being used for the current system access according to a predetermined rule; acquiring by the terminal the corresponding orthogonal code according to the orthogonal code information and modulating an access probe according to the orthogonal code; and transmitting the access probe by the terminal to the network and conducting network access.

There is provided a system for terminal access where the terminal responds to a paging message transmitted from a network. The system includes a paging message transmission unit in the network, configured to transmit a paging message to the terminal; an orthogonal code information determination unit in the terminal, configured to determine the orthogonal code information which differs from the one being used for the current system access according to a predetermined rule; a network access unit in the terminal, configured to modulate an access probe according to the orthogonal code and transmit the access probe to the network to conduct network access.

There is further provided a terminal for network access. The terminal includes a module for receiving a paging message from a network; a module for determining orthogonal code information according to a predetermined rule relating to the paging message, wherein the orthogonal code information differs from the one being used for current system access; a module for acquiring a corresponding orthogonal code according to the orthogonal code information; a module for modulating an access probe according to the orthogonal code; and a module for transmitting the access probe to the network.

According to the various embodiments, the terminal which responses the paging selects a unique access orthogonal code via a certain approach. It is guaranteed that the orthogonal code utilized by the terminal during access procedure not only differs from the one being used by the other terminals that respond to a paging, but also differs from the one being used by the other terminals which originate a call. In other words, it is guaranteed that the orthogonal code being used by the terminal responding to the paging will not be in conflict with the orthogonal code being used by other terminals. Compared with prior art, the conflicts as a result of coincidentally selecting the same orthogonal code between the terminals responding to the paging and between the terminal responding to the paging and the terminal originating the call can be avoided. Accordingly, the latency in paging response may be reduced effectively.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with the embodiment is included in at least one embodiment of the present disclosure. Thus, the appearances of the phrases "in one embodiment" or "in an embodiment," "specific embodiment," or the like in the singular or plural in various places throughout this specification are not necessarily all referring to the same embodiment. Furthermore, the particular features, structures, or characteristics may be combined in any suitable manner in one or more embodiments.

Detailed description is made below in conjunction with the accompanying drawings.

Embodiment 1

Figure 6:
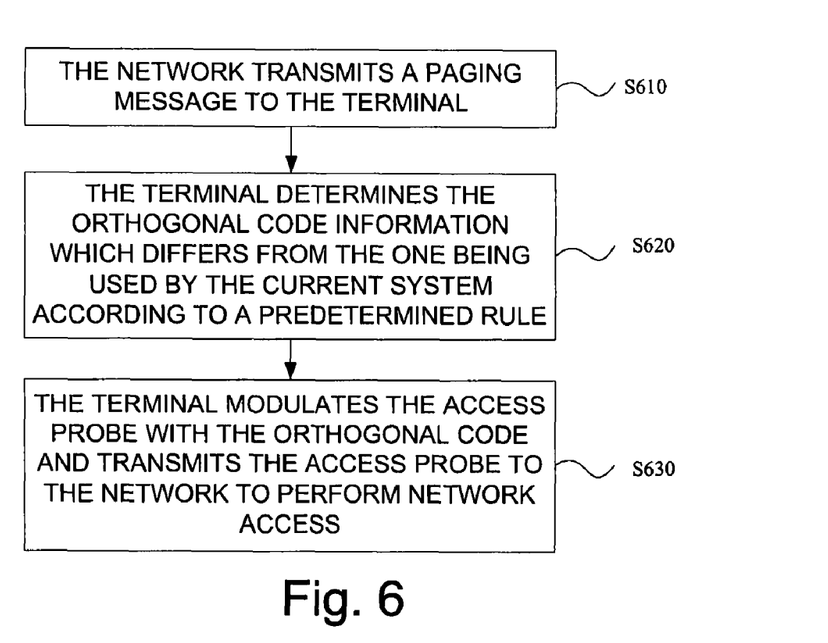
FIG. 6 is a schematic flowchart according to embodiment 1.

FIG. 6 illustrates a schematic flowchart according to embodiment 1, mainly including the following steps.

At S610, the network transmits a paging message to a terminal;

When the network pages a terminal, it transmits the paging message to the terminal. The format of the paging message complies with the related requirements of the foregoing current IEEE 802.20 protocol.

At S620, the terminal determines the orthogonal code information which differs from the one being used for the current system access according to a predetermined rule;

At this step, the terminal determines an orthogonal code which has not been used for the current system access according to the predetermined rule.

There may be a variety of predetermined rules. For example, the terminal may determine the orthogonal code to be used for current access according to the location of the paging message where the message is in the entire paging message packet and the system time of the paging message sent.

The orthogonal code to be used differs from the orthogonal code being used currently. Accordingly, it is guaranteed that the orthogonal code to be used by the terminal responding to the paging when initiating the access procedure differs from the orthogonal codes being used by the terminal originating the call in current system such that the access procedure may proceed well.

According to the scheme regarding embodiment 1, a dedicated orthogonal code resource can be specified exclusively for the terminal responding to the paging and the terminal may determine the orthogonal code to be used from the dedicated orthogonal code resource. If the terminal which responds to the paging has not exhausted the orthogonal code resource, the terminal which originates a call may also be allowed to utilize the unoccupied orthogonal code resource.

In the foregoing scheme, association can be established among a first orthogonal code resource, the location of the paging message where a given paging message locates in the entire paging message packet and the system time of the paging message. Specifically, the orthogonal codes in the first orthogonal code resource may be numbered and thus association may be build up based on the number, user ID and the result of a modulo-4 operation upon the superframe number associated with the current system. As such, in the process of actual terminal access, the orthogonal code information for use by the terminal may be determined according to the result of modulo-N operation upon the superframe number.

At S630, the terminal acquires a corresponding orthogonal code based on the orthogonal code information, modulates the access probe by the orthogonal code and transmits the access probe to the Access Network to conduct network access.

In the foregoing scheme, a timer may further be initiated in the step S620.

And, at step S630, the orthogonal code being used by the terminal may be ceased if the timer expires.

Embodiment 2

In embodiment 2, a portion of the orthogonal code resource may be specified among the available orthogonal code resource so as to be provided dedicatedly to terminals which respond to the paging for use during access. Further, association is established between the timer of the terminal and the orthogonal codes provided specifically for paging response. Then, the timer may be set according to time limits to the orthogonal code available to the terminal.

According to embodiment 2, 8 orthogonal codes from all the available orthogonal code resources are specifically assigned to terminals which respond to the paging, for example, the orthogonal codes with index number of 18-25. Further, the association is specified as shown in Table 1. Other orthogonal codes are dedicated to terminals which originates a call. A counter and a timer may further be included in the terminal where the initial state for the counter is 0. As shown in FIG. 2, if there is a plurality of quick paging messages in the forward superframe N, a complete paging message will be transmitted with superframe N+1 and a new quick paging message will be transmitted with superframe N+2. If there is more than one quick paging, the detailed paging message of superframe N+2 will be transmitted with superframe N+3. Successive superframes may refer to the foregoing process. Consequently, if only 8 dedicated orthogonal codes are specified for the terminals responding to the paging, the dedicated orthogonal code which is determined, at superframe N+1, by the terminal on it own initiative according to the association presented in Table 1 may be used by the new paging message of the terminal at superframe N+3. Therefore, there is a validity period of 2 superframes for the orthogonal code which is determined at superframe N+1 by the terminal on its own initiative according to the association. Otherwise, the orthogonal code will be the same as the one used by terminal at superframe N+3, causing conflicts thereby. Therefore, if the terminal which was paged at superframe N+1 has already accessed into the system at the reverse superframe within two superframes, there is no need for orthogonal codes any more and no conflicts regarding the orthogonal codes will occur. If the terminal which was paged at superframe N+1 is not able to access into the system at the reverse superframe within two superframes, a timer of 2 superframes must be specified. However, if the terminal which responds to the paging has not received Access Grant message from the network after the timer expires, the terminal which responds the paging should select an orthogonal code for access purpose among a rest orthogonal code set remained for originating the call.

TABLE 1 association between the counter value of the terminal and the index number of the orthogonal code

| Counter Value | Index No. of orthogonal code |
| --- | --- |
| 1 | 18 |
| 2 | 19 |
| 3 | 20 |
| 4 | 21 |
| 5 | 22 |
| 6 | 23 |
| 7 | 24 |
| 8 | 25 |

Embodiment 3

According to embodiment 3, an association table which illustrates the association between the value of the counter in the terminal and the result of modulo-4 operation upon the superframe number associated with the current system as well as the usage of orthogonal code is specified. After the terminal receives the paging message transmitted from the system side, an orthogonal code to be used by the terminal for the current access can be determined according to the foregoing association table.

Figure 7:
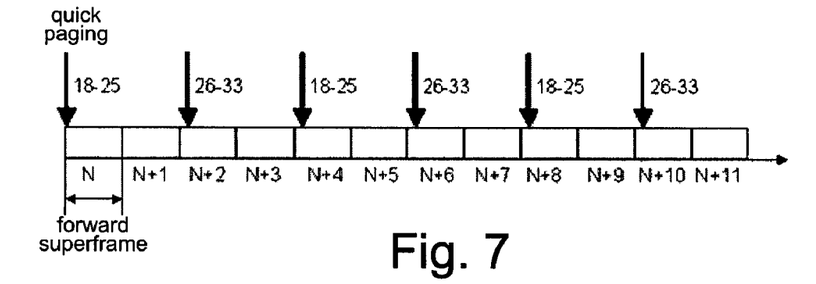
FIG. 7 is a diagram illustrating the association between different superframes and orthogonal codes according to embodiment 3.

According to embodiment 3, 16 orthogonal codes from all the available orthogonal code resources are specifically assigned to the terminals which respond to the paging, for example, the orthogonal codes with index number of 18-33. Further, the association is specified as shown in Table 2. Other orthogonal codes are dedicated to the terminals which originate a call. A counter and a timer may further be included in the terminal where the initial state for the counter is 0. As shown in FIG. 7, if there is a plurality of quick paging messages, a complete paging message will be transmitted with superframe N+1 and a new quick paging message will be transmitted with superframe N+2. If there is more than one quick paging message, the detailed paging message of superframe N+2 will be transmitted with superframe N+3. Successive superframes may refer to the foregoing process. Therefore, if 16 dedicated orthogonal codes are specified for the terminals which respond to the paging, there would be 8 dedicated orthogonal codes 18-25 determined, at superframe N+1, by the terminal on its own according to the association presented in Table 2 and there would be 8 orthogonal codes 26-33, at superframe N+3, available to the terminals in the new paging message. However, at superframe N+4, since the orthogonal codes 18-25 will be reused by the terminals in the new paging message, there would be a validity period of 4 superframes for the orthogonal codes determined by the terminal on its initiative according to the association. Otherwise, the orthogonal code would be the same as the one used by the terminal at superframe N+5, causing conflict thereby. Therefore, if the terminal which was paged at superframe N+1 has already accessed into the system at the reverse superframe within 4 superframes, there is no need for orthogonal codes any more and no conflict regarding the orthogonal codes will occur. If the terminal which was paged at superframe N+1 could not access into the system at the reverse superframe within 4 superframes, a timer of 4 superframes must be specified. However, if the terminal which responds to the paging has not received Access Grant message from the network after the timer expires, the terminal which responds the paging should select an orthogonal code for access purpose among a rest orthogonal code set remained for originating the call.

In this case, different orthogonal code resources can be used at superframe N and N+2 and be reused at superframe N+4 and N+6. Therefore, to differentiate superframe N and N+2, a method of modulo operation may be used, as shown in FIG. 7. That is, modulo-4 operation is performed upon superframe number. If the result of modulo operation is 0, orthogonal codes 18-25 are the available resource. If the result of modulo operation is 2, orthogonal codes 26-33 are the available resource.

TABLE 2 association between the counter value of terminal and the index number of the orthogonal code

| Counter Value | Index NO. of orthogonal codes available to the quick paging message to which superframe N corresponds (superframe number modulo 4 is 0) | Counter Value | Index NO. of orthogonal codes available to the quick paging message to which superframe N + 2 corresponds (superframe number modulo 4 is 2) |
|---|---|---|---|
| 1 | 18 | 1 | 26 |
| 2 | 19 | 2 | 27 |
| 3 | 20 | 3 | 28 |
| 4 | 21 | 4 | 29 |
| 5 | 22 | 5 | 30 |
| 6 | 23 | 6 | 31 |
| 7 | 24 | 7 | 32 |
| 8 | 25 | 8 | 33 |

FIG. 7 illustrates association between the different superframes and the orthogonal codes according to embodiment 3.

Figure 8:
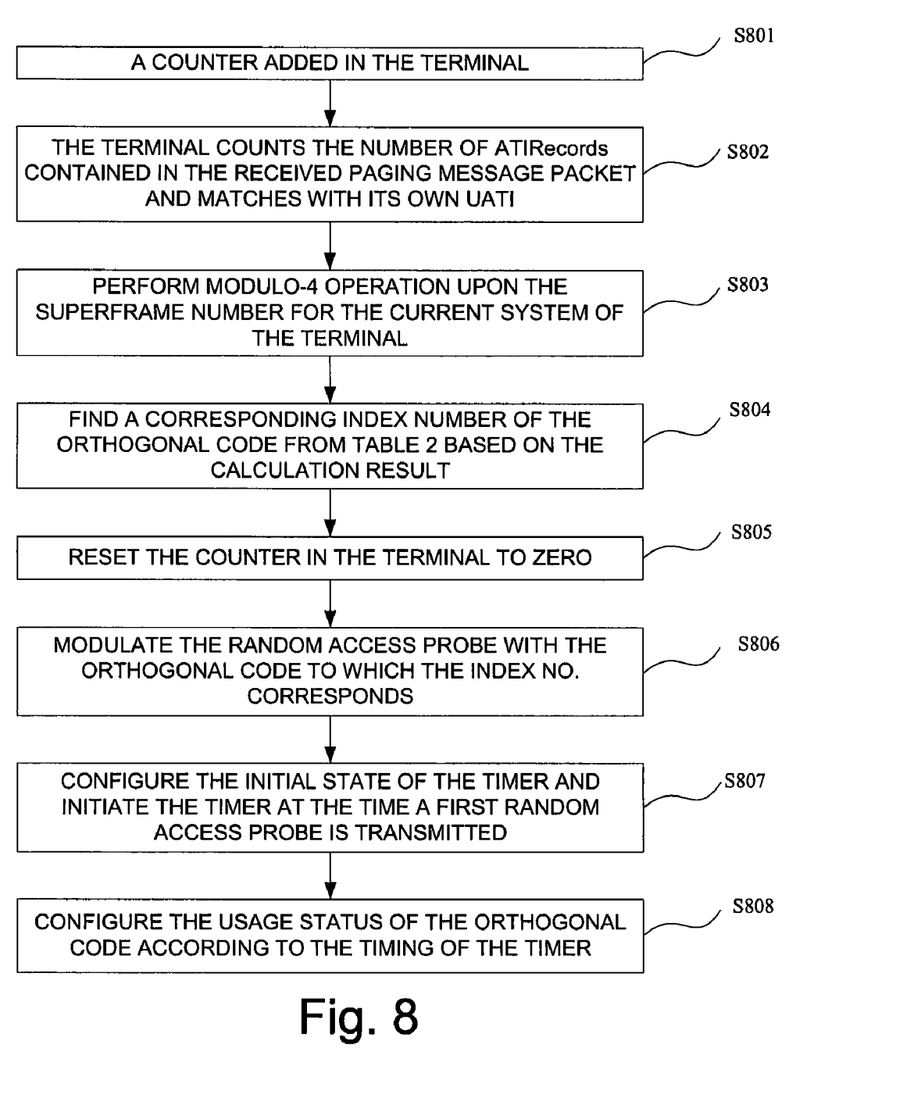
FIG. 8 is a schematic flowchart according to embodiment 3.

FIG. 8 illustrates a schematic flowchart according to embodiment 3 which embodiment 3 includes the following steps, as shown in the figure.

At S801, a counter may be added in every terminal where the initial state for the counter is 0.

At S802, if the network transmits multiple quick paging messages in the primary broadcasting channel pBCH1, the terminal receives a corresponding complete paging message in the F-DCH block of the next superframe. The terminal counts the number of ATIRecords contained in the paging message and matches with the terminal's own UATI. Alternatively, the terminal may count the number of the received broadcasting paging message PageUATI and matches with the terminal's own UATI.

Embodiment 3 is a scheme directed at multiple paging messages transmitted by the network. If the network only transmits one paging message in pBCH1, the counter value of the terminal which matches with this paging message counts 1. That is, the terminal which responds to the paging utilizes the orthogonal codes with index number 18 or 26 according to Table 1 to initiate the random access. The counter of the terminal which does not match up with this message resets to zero.

When the terminal receives a paging message packet in the corresponding block in the F-DCH of the terminal wherein the message packet contains multiple ATIRecords, the counter value increases by one everytime a ATIRecord is read until the ATIRecord which matches with the terminal's own UATI is read.

Alternatively, when the terminal receives the PageUATI message in the F-DCH, or when the terminal receives the paging packet containing multiple paging messages and the PageUATI message with a single paging message, the counter value increases by one everytime a paging message is read until the paging message which matches with the terminal's own UATI is read.

If the terminal has not find the same UATI in the paging messages from the network which can match with the terminal's own UATI, or, there is no call to the terminal in this paging message, then the counter of the terminal resets to zero.

At S803, the terminal performs modulo-4 operation upon the superframe number associated with the current system.

At S804, a corresponding index number of the orthogonal code may be found in the Table 2 based on the calculation result.

The corresponding index number of the orthogonal code may be found in Table 2 based on the counter value obtained via step S802 (which determines the row value in Table 2) and the result calculated via the above step S803 (which determines the column value in Table 2).

At S805, the counter of terminal is reset to zero.

At S806, the orthogonal code to which the index number corresponds is used to modulate the random access probe.

At S807, initial state of the timer is specified as a validity period of 4 superframes. The timer is initiated at the time a first random access probe is transmitted.

At S808, a usage status of the orthogonal code is configured according to the timing of the timer.

If the terminal which responds to the paging has received Access Grant message from the network before the timer expires, the timer is reset to zero.

If the terminal which responds to the paging still has not received the Access Grant message from the network at the time when the timer expires, the timer is reset to zero and the terminal may not be allowed to use the related orthogonal code any more and the terminal has to select an orthogonal code from the orthogonal code set available to the terminals originating the call to perform random access.

Embodiment 4

Figure 9:
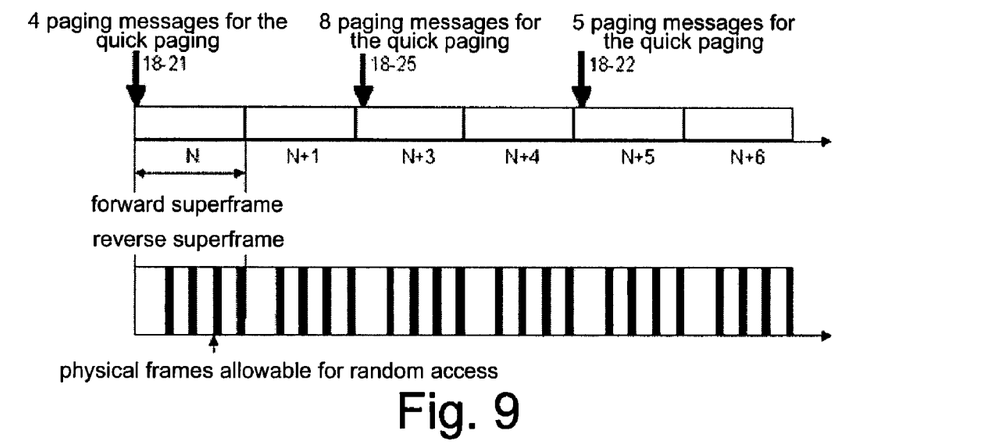
FIG. 9 is a diagram where the terminal originating the call listens to a quick paging massage according to embodiment 4.

According to embodiment 4, a dedicated orthogonal code is specified for the terminal which responds to the paging. However, it differs from that of embodiment 2. That is, the terminal which starts a initial call needs to listen to the quick paging message in the preamble of the forward superframe. FIG. 9 illustrates a schematic diagram in which the terminal originating the call listens to the quick paging message according to embodiment 4. When 4 quick paging messages are heard in the forward superframe N, orthogonal code number 18-21 are reserved in default for use by the terminals responding to the paging and the terminal which originates the call selects the orthogonal code starting from index number 22 for access. Like embodiment 2, there is a validity period of 2 superframes for use. In other words, the random access of the terminal which originates the call shall be completed before superframe N+2 ends; otherwise, the terminal shall switch to the orthogonal code set which the terminal originating the call is supposed to use to select an orthogonal code for access.

Embodiment 5

Figure 10:
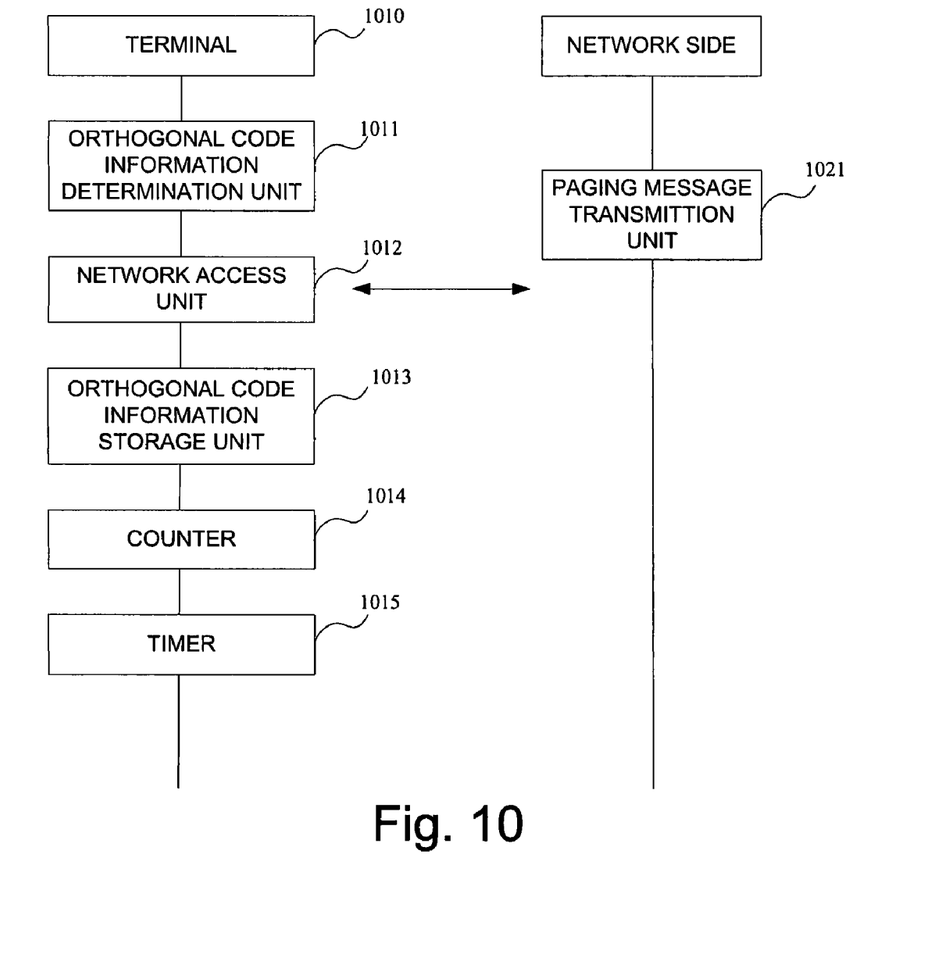
FIG. 10 is a system block diagram according to embodiment 5.

FIG. 10 illustrates a block diagram of a terminal access system according to embodiment 5. As shown in the figure, the system includes a network, adapted to perform an access procedure for terminal 1010. The system further includes the following components.

A paging message transmission unit 1021 located in the network, is configured to transmit a paging message to a terminal.

An orthogonal code information determination unit 1011, located in the terminal 1010 or other positions, is configured to determine the orthogonal code information for use by the current access according to a predetermined rule. For instance, the orthogonal code information determination unit 1011 may determine the orthogonal code information for use by the current access according to terminal ID information and system superframe information, etc.

A network access unit 1012, located in the terminal 1010 or other positions, is configured to modulate an access probe according to the orthogonal code and transmit the access probe to the network to perform network access.

The system further includes an orthogonal code information storage unit 1013 configured to store a predetermined rule for determining orthogonal code. For instance, the association among the orthogonal code resource, the position of the paging message and the system time of the paging message may be predetermined.

The system further includes a counter 1014 located in the terminal 1010 or other positions. The counter is configured to count the number of ATIRecords contained in the F-DCH paging message of the received physical frame and count the number of PageUATI messages.

The system further includes a timer 1015 located in the terminal 1010 or other position. The timer is configured to set a threshold.

In the foregoing embodiments, the orthogonal code which is used to module the access probe may also be obtained via a combination or variation of the orthogonal code information and other information. For instance, the orthogonal code may relate to the pilot frequency strength of the terminal or relate to the associated information in the paging message, or relate to the formula obtained from the combination or variation of such information.

According to the schemes of the various embodiments, by selecting a unique access orthogonal code by the terminal, it is guaranteed that the orthogonal code which the terminal is using during the access procedure differ from the ones which the other terminals responding to the paging are using and also differ from the orthogonal codes which the other terminals originating the call are using. In other words, it is guaranteed that the orthogonal code that the terminal responding to the paging is using will not be in conflict with the orthogonal codes being used by other terminals. Compared with the prior art, various embodiments completely avoid the conflicts as a result of using the same orthogonal code between the terminals responding to the paging and between the terminal responding to the paging and the terminal originating the call. Accordingly, the latency in the response to the paging may be reduced effectively.

Moreover, since the orthogonal codes used by the terminals responding to the paging will not be in conflict with each other for sure, in the random access mechanism, the random backoff time designed for prevention of conflicts may all set to 0 and each control field may allow the terminals responding to the paging to transmit the random access probe. Therefore, the latency in the paging response may further be reduced.

A variety of modifications and variations may be made by those skilled in the art without departing from the spirit and scope of the present disclosure. Accordingly, the present disclosure intends to incorporate these modifications and variations if these modifications and variations fall within the scope of the claims of the present disclosure and equivalent thereof.

What is claimed is:

1. A method for terminal access, comprising:
   receiving, by a terminal, a paging message from a network;
   determining, by the terminal, orthogonal code information which differs from the one being used for current system access according to a predetermined rule;
   acquiring, by the terminal, a corresponding orthogonal code according to the orthogonal code information;
   modulating, by the terminal, an access probe according to the orthogonal code; and
   transmitting, by the terminal, the access probe to the network;
   wherein the determining by the terminal the orthogonal code information which differs from the one being used for the current system access according to a predetermined rule further comprises:
   performing, by the terminal, a modulo-N operation upon a subframe number associated with the current system; and
   determining, by the terminal, the corresponding orthogonal code information according to the result of the modulo-N operation upon the superframe number.

2. The method of claim 1, wherein the predetermined rule is to select the orthogonal code information from a first orthogonal code resource.

3. The method of claim 1, wherein the orthogonal code information is an index of the orthogonal codes, and the terminal acquires the corresponding orthogonal code according to the index of the orthogonal codes.

4. The method of claim 1, wherein the predetermined rule is to determine the orthogonal code information according to at least one of the followings:
   the number of paging messages, location of the paging message and system time of the paging message.

5. The method of claim 4, further comprising establishing an association among the first orthogonal code resource, the location of the paging message and the system time of the paging message.

6. The method of claim 5, further comprising numbering the first orthogonal code resource and establishing the association among the first orthogonal code resource, the location of the paging message and the system time of the paging message according to the numbering.

7. The method of claim 1, wherein acquiring by the terminal the corresponding orthogonal code according to the orthogonal code information further comprises:
counting by the terminal a plurality of received paging messages according to a set counter;
searching, by the terminal, the association based on the counting result; and
determining, by the terminal, the orthogonal code to be used by the terminal.

8. The method of claim 1, wherein:
the determining by the terminal the orthogonal code information which differs from the one being used for the current system access according to a predetermined rule further comprises initiating a first timer; and
the transmitting the access probe by the terminal to the network and performing network access further comprise terminating the orthogonal code used by the terminal according to a threshold set by the first timer.

9. A system for terminal access, wherein a terminal responds to a paging message transmitted from a network, the system comprising:
a paging message transmission unit configured to transmit a paging message to the terminal;
an orthogonal chip information determination unit configured to determine orthogonal code information which differs from the one being used for the current system access according to a predetermined rule; and
a network access unit configured to modulate an access probe according to the orthogonal code and transmit the access probe to the network to perform network access;
wherein the orthogonal chip information determination unit is further configured to:
perform a modulo-N operation upon a superframe number associated with the current system and determine the corresponding orthogonal code information according to the result of the modulo-N operation upon the superframe number.

10. The system of claim 9, further comprising an orthogonal code information storage unit configured to store the rule for determining the orthogonal code.

11. The system of claim 10, further comprising a counter configured to count the received paging messages.

12. The system of claim 10, further comprising a timer configured to set a threshold.

13. A terminal for network access, comprising:
a module for receiving a paging message from a network;
a module for determining orthogonal code information according to a predetermined rule relating to the paging message, wherein the orthogonal code information differs from the one being used for current system access;
a module for acquiring a corresponding orthogonal code according to the orthogonal code information;
a module for modulating an access probe according to the orthogonal code; and
a module for transmitting the access probe to the network;
wherein the module for determining the orthogonal code information further comprises:
a module for performing a modulo-N operation upon a superframe number associated with the current system; and
a module for determining the corresponding orthogonal code information according to the result of the modulo-N operation upon the superframe number.

14. The terminal of claim 13, wherein the predetermined rule is to determine the orthogonal code information according to at least one of the followings:
the number of paging messages, location of the paging message and system time of the paging message.

15. The terminal of claim 14, further comprising a module for establishing an association among the first orthogonal code resource, the location of the paging message and the system time of the paging message.

16. The terminal of claim 15, further comprising a module for numbering the first orthogonal code resource and establishing the association among the first orthogonal code resource, the location of the paging message and the system time of the paging message according to the numbering.

17. The terminal of claim 13, wherein the module for acquiring the corresponding orthogonal code according to the orthogonal code information further comprises:
a counter for counting a plurality of received paging messages according to a set counter;
a module for searching the association based on the counting result; and
a module for determining the orthogonal code to be used by the terminal.

18. The terminal of claim 13, wherein the module for determining the orthogonal code information further comprises a module for initiating a first timer; and the module for transmitting the access probe to the network further comprise a module for terminating the orthogonal code used by the terminal according to a threshold set by the first timer.

* * * * *